United States Patent Office 2,973,247
Patented Feb. 28, 1961

2,973,247

TITANIUM BORIDE AND METHOD FOR MAKING SAME

Helmut Espenschied, Metuchen, N.J., assignor to National Lead Company, New York, N.Y., a corporation of New Jersey No Drawing. Original application Sept. 3, 1952, Ser. No. 307,721. Divided and this application Dec. 10, 1953, Ser. No. 397,470

4 Claims. (Cl. 23—204)

The present invention relates in general to refractory metal compounds and more particularly to titanium compounds of boron and to an improved method for making the same, the instant application being a division of applicant's co-pending application Serial No. 307,721, filed September 3, 1952, now abandoned, for Titanium Metalloids and Method for Making Same.

Heretofore, refractory metal compounds of carbon, zirconium and the like, sometimes referred to hereinafter as metalloids, have been prepared with a modicum of success by heating dry mixtures of a refractory metal oxide such as, for example, calcined titanium dioxide or zirconium oxide and carbon to form the refractory metal carbide. However, prior methods have had to contend with the problem of obtaining intimate and permanent contact between the inherently coarse metal oxide particles and the carbon particles which, due to their fineness, tend to separate out from the mixture during fusion. In attempting to overcome this difficulty, prior technicians have resorted to pelletizing the mixtures and then heating the pellets at temperatures from 2000° C. to 2500° C. The resulting product is a hard sintered mass of material which must be subsequently broken up into smaller particles and ground. However, such products can be ground mechanically to form a finely divided powder only with great difficulty due to the abrasiveness and hardness of the compositions. Hence, even the ground material is relatively coarse, the smallest particle size being about 80 microns. Moreover, the purity and toughness of this product is often impaired by a high percentage of graphite which is formed from the carbon at the high sintering temperatures used. Although these relatively coarse products have been used in the field of powder metallurgy, the impurity and coarse granular nature of the material has impaired its usefulness. There is, therefore, no direct and commercially practicable method for producing finely divided relatively pure metalloids without recourse to grinding and milling operations.

An object, therefore, of the present invention is to provide an improved method for making a refractory metal compound of boron which is economical, which may be carried out at relatively low temperatures and which is productive directly of a relatively pure finely divided product.

A further object of the invention is to provide a superior method for forming a mixture of carbon, a refractory metal and boron wherein the carbon particles are maintained an intimate contact with the particles of refractory metal.

A still further object of the invention is to provide substantially pure finely divided titanium boride composition.

These and other objects will become apparent from the following more complete description of the instant invention.

The term "finely divided" as used herein with reference to the size of the particles of titanium boride formed directly by the process of this invention shall be understood to mean that the effective sizes of the particles may vary from 1 to 15 microns.

In its broadest aspects, the present invention relates to a new and improved titanium boride composition; and to an improved method for making said composition which comprises forming an intimate mixture of titania hydrate, carbon and an oxidic compound of boron, and then heating the mixture in an inert atmosphere at a temperature in the range of from 1300° C. to 1750° C. to produce finely divided particles of titanium boride.

In carrying out the invention it was discovered that the successful production of a substantially pure finely divided titanium boride composition is dependent, in large measure, upon achieving an intimate mixture of the carbon and titanium components. As pointed out above, due to the coarseness of calcined oxides of titanium, as compared to the particle size of lamp black, it is impossible to form and maintain an intimate mixture of calcined titanium dioxide and finely divided carbon. However, the instant invention embraces the discovery that the problem of forming intimate mixtures of titanium and carbon can be effectively solved by providing the titanium component in the form of a titanic acid hydrolysate, sometimes known as basic titanium sulfate or basic titanium chloride, and referred to hereinafter as titania hydrate.

The titania hydrate used in carrying out the process of this invention may be titania metahydrate or titania orthohydrate and is preferably an untreated hydrate which occurs as an intermediate product in the production of titanium dioxide pigment and which is generally referred to in the art as "pulp." This untreated titania hydrate comprises primary particles, the effective sizes of which may be from .05 to .1 micron. Moreover, since the untreated pulp is usually formed by hydrolyzing an acid solution of titaniferous ore, the untreated pulp will contain or be combined with about 10% acid on the basis of the titanium dioxide content. The pulp may be formed from a sulfate solution and in such cases will contain about 10% sulfuric acid. However, a chloride solution may be used in which case hydrochloric acid will be present in the titania hydrate.

In achieving the objects of this invention it has been discovered, quite unexpectedly, that an aqueous slurry comprising untreated titania hydrate, water and finely divided carbon formed an intimate mixture of the hydrate and carbon particles; and that when an oxidic compound of boron was added to this mixture and the whole mass calcined at relatively low temperatures, in the range of from 1300° C. to 1750° C. and in an inert atmosphere, a substantially pure finely divided titanium boride composition was formed.

While an exact explanation for the intimate coalescence of the particles of hydrate and carbon is not thoroughly understood, it is postulated that since the finely divided particles of hydrate are of substantially the same size as the carbon particles, the respective particles intermingle readily to form a substantially homogeneous mixture; and that this tendency is augmented by the presence of the 10% acid (sulfuric or hydrochloric) which forms an acid slurry and appears to act as a wetting agent for wetting the particles of carbon.

With respect to the carbon used in the mixture of materials, a finely divided carbon, such as lamp black or oil burner soot, is suitable, the unit particles of which have an effective size of from about .01 to .05 micron.

In carrying out the process of this invention for the preparation of titanium boride, the titanium component in the form of titania hydrate is mixed with water and with carbon in the form of lamp black or oil burner soot and wet milled to form a slurry to which is added an oxidic compound of boron. After thoroughly agitating the mixture, it may then be dried by heating to a suitable temperature to form a substantially dry cake.

The dried or partially dried cake is then ground to provide a powdery material of substantially uniform particle size which is transferred directly to calcining means, such as, for example, an induction furnace or a rotating kiln capable of maintaining the temperatures required for calcining the powdered material. The material is calcined at temperatures in the range of from about 1350° C. to about 1750° C. and preferably from 1350° C. to about 1500° C. for from about 1 to 3 hours in an atmosphere of argon.

The oxidic compound of boron may be added as boric oxide but since mixing of the constituents is carried out in an aqueous slurry, the boron component is preferably added as boric acid powder. It is equally effective but less convenient to add the boric acid powder to the dried slurry prior to calcining.

Although the preliminary drying and calcining treatments of the slurry is described above as comprising two separate steps, it will be understood that the drying and calcining treatments may be accomplished in the calcining means as one operation.

The reaction between the hydrate, carbon and boric acid during calcination may be represented by the following equation:

$$TiO_2 + B_2O_3 + 5C = TiB_2 + 5CO$$

wherein 1 mol of titanium dioxide added in the form of titania hydrate containing about 10% sulfuric acid reacts with 1 mol of boron oxide added in the form of boric acid and 5 mols of carbon to produce 1 mol of titanium boride and 5 mols of carbon monoxide.

Since boric acid is somewhat volatile with water vapor, it is desirable to add substantially 10% or higher excess boric acid over the theoretical amount, any excess boric acid being effectively removed by simple washing of the calcined product.

The calcined product is a finely divided powder of high purity, the unit particles comprising from 67.5% to 69% titanium and from 30.5 to 31% boron as compared to the theoretical amounts of 69% and 31% respectively for pure titanium boride. The crystalline structure of the unit particles comprises essentially substantially hexagonal plates of from 5 to 30 microns size. When higher calcining temperatures are used the calcining time is decreased and the effective size of the particles may be less than 5 microns.

To further illustrate the invention, the following example is given:

Example I

To 456 parts by weight of titania hydrate containing about 10% sulfuric acid were added 98 parts by weight of carbon in the form of lamp black and 198 parts by weight of boric acid to form a thick acid slurry. The slurry was then agitated for a sufficient length of time to insure an intimate mixture of the hydrate, carbon particles and boric acid whereupon the slurry was dried by heating to a temperature of 200° C. for 6 hours. The resulting dried cake was ground to provide a powder of substantially uniform particle size which was then introduced into a furnace and calcined at a temperature of about 1500° C. for about 1.5 hours in an atmosphere of argon.

The resulting product comprised a finely divided powder which analyzed about 67.8% titanium and 29.8% boron, the effective size of the primary particles being from 1 to 15 microns.

In accordance with the improved process of this invention, metalloids of refractory metals and in particular titanium boride may be produced in an efficient and economical manner and from relatively inexpensive source materials. Moreover, the temperatures employed are relatively low, thereby precluding sintering and the formation of relatively large size particles. Further, the finely divided powder of this invention is the direct product of the calcination treatment, that is to say, requires no subsequent grinding operations and has an effective particle size ranging from 1 to 15 microns, the titanium boride particles being substantially free of free carbon, occluded graphite or other foreign materials. The highly superior titanium boride produced by the present invention is thus ideally suited for use in powder metallurgy, as an abrasive, and in the production of cutting tool alloys and high temperature resistant alloys.

I claim:

1. Method for the production of a titanium compound of boron which comprises slurrying a mixture of an uncalcined titania hydrate pulp, carbon and an oxidic compound of boron, and heating said slurry at a temperature of from 1350° C. to 1750° C. in an inert atmosphere to produce finely divided titanium boride having a particle size from about 1 micron to about 15 microns.

2. Method for the production of titanium boride which comprises admixing uncalcined titania hydrate pulp, lamp black and water to form a slurry, adding an oxidic compound of boron to said slurry and then heating said mixture at a temperature of from 1350° C. to 1500° C. in an inert atmosphere to calcine said mixture and produce finely divided titanium boride having a particle size from about 1 micron to about 15 microns.

3. Method for the production of titanium boride which comprises forming an intimate wet mixture of uncalcined titania hydrate pulp, carbon, an oxidic compound of boron and a wetting agent comprising substantially 10% occluded sulfate values, heating said mixture at a temperature of from 1350° C. to 1500° C. in an atmosphere of argon to calcine said mixture and produce a finely divided titanium boride having a particle size from about 1 micron to about 15 microns.

4. Method for the production of titanium boride which comprises admixing uncalcined titania hydrate pulp, carbon and boric acid to form a slurry, agitating said slurry to form an intimate mixture of said hydrate, carbon and boric acid, and then heating said mixture at a temperature of from 1350° C. to 1500° C. in an atmosphere of argon to calcine said mixture and produce finely divided titanium boride having a particle size from about 1 micron to about 15 microns.

References Cited in the file of this patent

UNITED STATES PATENTS

| | | |
|---|---|---|
| 1,913,373 | De Golyer | June 13, 1933 |
| 2,678,870 | Cooper | May 18, 1954 |
| 2,735,155 | Glaser | Feb. 21, 1956 |

OTHER REFERENCES

Goetzel: "Treatise on Powder Metallurgy," vol. II, pages 86, 87 and 89 (1950).

Barksdale: "Titanium," Ronald Press Co., New York, 1949, pages 152–153.

Norton et al.: "Journal of Metals," vol. 1, pp. 749–751, October 1949.

Kingston: "The Physico of Powder Metallurgy," 1st ed., 1951, pp. 295–302.